G. E. LE CLAIR.
ATTACHMENT FOR BOTTLES OR JARS.
APPLICATION FILED NOV. 26, 1913.
1,115,444.
Patented Oct. 27, 1914.
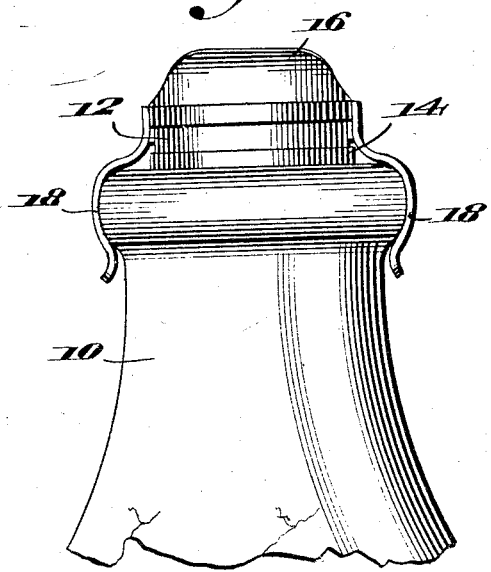
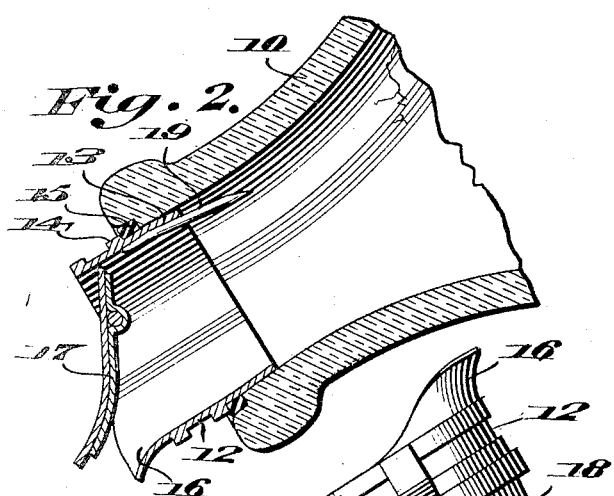
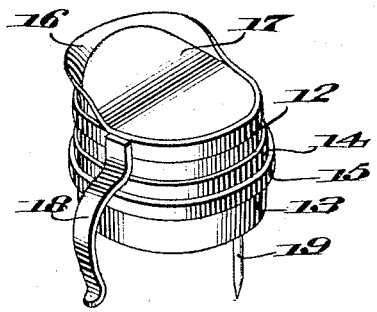
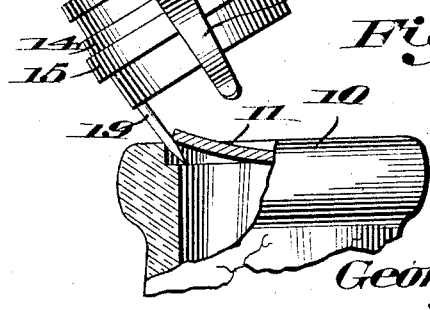
Inventor
George E. Le Clair
By Victor J. Evans
Attorney
Witnesses

UNITED STATES PATENT OFFICE.

GEORGE E. LE CLAIR, OF FLINT, MICHIGAN.

ATTACHMENT FOR BOTTLES OR JARS.

1,115,444.  Specification of Letters Patent.  Patented Oct. 27, 1914.

Application filed November 26, 1913. Serial No. 803,276.

*To all whom it may concern:*

Be it known that I, GEORGE E. LE CLAIR, a citizen of the United States, residing at Flint, in the county of Genesee and State of Michigan, have invented new and useful Improvements in Attachments for Bottles or Jars, of which the following is a specification.

The invention relates to bottles and jars, and has for an object to provide an attachment therefor, for permitting of readily pouring the contents of the bottle or jar therefrom and for closing the opening to the bottle or jar when the same is not in use.

The invention is particularly adaptable for use on milk bottles and comprehends a device that can be attached to the top of the milk bottle and includes a pouring spout normally closed by a suitable swinging closure whereby, when the bottle is tilted, the closure will be opened to permit the contents of the bottle to be poured therefrom, means being provided for initially removing the usual paste board cap from the milk bottle prior to applying my device thereto.

In the further disclosure of the invention reference is to be had to the accompanying drawings, constituting a part of this specification, in which similar characters of reference denote corresponding parts in all the views, and in which:

Figure 1 is a side elevation of my device, showing the same applied to the bottle; Fig. 2 is a vertical sectional view taken through the device and the bottle, showing the bottle in pouring position; Fig. 3 is a perspective view of the device as removed from the bottle; and Fig. 4 is a fragmentary side elevation showing the manner of initially removing the paste board cap from the bottle in order that my device can be applied thereto.

Referring more particularly to the views, I disclose a bottle 10 normally closed by the usual wafer like disk or cap 11. A body 12, of a tubular nature, includes an integral reduced portion 13 adapted to be received within the neck of the bottle 10, an annular rib 14 being formed on the body 12, with a suitable washer 15 encircling the reduced portion 13 and abutting against the rib 14 in order to effect a seal between the bottle and the body and prevent any leakage at this point. The body 12 includes an integral spout 16 and mounted to swing on the body is a closure 17 normally closing the spout 16, the closure being so arranged to swing that when the bottle 10 is tilted the closure will swing into an open position to permit the contents of the bottle to be poured therefrom through the spout 16. A plurality of spring-like gripping members 18 are secured to the body and are preferably curved, with their free ends adapted for clamping engagement with the neck of the bottle 10 when the same is applied thereto and projecting from the reduced portion 13 of the body 12 is a pointed member 19 adapted for use in initially removing the disk 11 from the bottle 10 in order that my device can be applied thereto.

In the use of the device described and particularly when the device is used in connection with milk bottles, the member 19 is first employed to remove the disk 11 from the bottle and unseal the same, after which my device is applied thereto with the reduced portion 13 extending within the neck and the washer 15 engaging the neck to provide a seal between the body and the neck, the gripping members 18 being adapted to grip the outside of the neck and rigidly hold my device thereon; it being also apparent from the views that the member 19 will lie within the neck and therefore be prevented from injuring persons who handle the bottle. By simply tilting the bottle when the device is applied thereto the closure 17 will swing into open position so that the contents of the bottle can be readily poured out through the spout 16 and when the bottle is again arranged in an upright position it will be apparent that the closure 17 will assume a closed position and effectively close the spout 16.

From the foregoing description it will be seen that my device is of a simple and durable construction, can be cheaply manufactured and can be quickly and easily applied to bottles, particularly those adapted to contain milk.

Having thus described my invention, I claim:

In a device for bottles, the combination with a body having an integral reduced portion adapted to fit within the neck of the bottle, of an annular rib on the body, a washer encircling the reduced portion and abutting against the rib, with the said washer adapted to engage the neck of the bottle and lie in a depression formed therein, opposed gripping members carried by the body and adapted to engage the exterior of the neck of the bottle to hold the body thereon, and a closure mounted to swing on the body and normally closing the opening of the said bottle.

In testimony whereof I affix my signature in presence of two witnesses.

GEORGE E. LE CLAIR.

Witnesses:
HAROLD P. BRIGGS,
FRANCIS M. BUFFUM.